United States Patent [19]
Lockett et al.

[11] Patent Number: 5,132,056
[45] Date of Patent: Jul. 21, 1992

[54] STRUCTURED COLUMN PACKING WITH IMPROVED TURNDOWN AND METHOD

[75] Inventors: Michael J. Lockett; Richard A. Victor, both of Grand Island; James D. Augustyniak, Depew, all of N.Y.

[73] Assignee: Union Carbide Industrial Gases Technology Corporation, Danbury, Conn.

[21] Appl. No.: 705,911

[22] Filed: May 28, 1991

[51] Int. Cl.5 .................................................. B01F 3/04
[52] U.S. Cl. .................................................. 261/112.2
[58] Field of Search .................................... 261/112.2

[56] References Cited

U.S. PATENT DOCUMENTS

| | | | |
|---|---|---|---|
| 2,047,444 | 7/1936 | Stedman | 261/106 |
| 3,415,502 | 12/1968 | Munters | 261/112.2 |
| 3,785,620 | 1/1974 | Huber | 261/112.2 |
| 4,186,159 | 1/1980 | Huber | 261/112 |
| 4,296,050 | 10/1981 | Meier | 261/112 |
| 4,657,711 | 4/1987 | Wigley | 261/112.2 |
| 4,670,196 | 6/1987 | Hsia | 261/112 |
| 4,710,326 | 12/1987 | Seah | 261/112 |
| 4,929,399 | 5/1990 | Lockett et al. | 261/112.2 |
| 4,950,430 | 8/1990 | Chen et al. | 261/112.2 |

FOREIGN PATENT DOCUMENTS

| | | | |
|---|---|---|---|
| 1095827 | 2/1981 | Canada | 261/112.2 |
| 0190435 | 8/1986 | European Pat. Off. | 261/112.2 |
| 44-22842 | 9/1969 | Japan . | |

OTHER PUBLICATIONS

Montz High Efficiency Structured Packings, Nutter Engineering, Bulletin B-1, 1987, Tulsa, Ok. 74170.

*Primary Examiner*—Tim Miles
*Attorney, Agent, or Firm*—Stanley Ktorides

[57] ABSTRACT

Structured metal column packing with corrugations and textured surfaces having a defined construction of the corrugation corners which enables significantly improved performance especially under turndown conditions.

21 Claims, 5 Drawing Sheets

STRUCTURED COLUMN PACKING WITH IMPROVED TURNDOWN AND METHOD

TECHNICAL FIELD

This invention relates generally to structured column packing of corrugated sheet material having a textured surface.

BACKGROUND ART

Structured column packing has been known for many years for use in a distillation column for the rectification of a fluid mixture. Early forms of structured packing included Stedman packing, described in U.S. Pat. No. 2,047,444. In general, structured packing refers to packing wherein individual members have a specific orientation relative to each other and to the column axis.

Recent advances in structured packing include the development of structured packing made from thin sheets of corrugated material. Generally the material is metal. This structured packing is made by corrugating the thin sheets so that the corrugations form diagonally on the sheets. The packing is employed in a column with the sheets in a vertical orientation so that the corrugations are at an angle to the column axis.

An improvement in corrugated structured packing is the texturization of the packing sheet surface. The texturization improves the uniform spreading of liquid over the packing surface thus improving the vapor-liquid contact and thus the mass transfer within the column. Many different kinds of texturizations are known such as fluting, lancing or embossing the sheet surface. Other texturization techniques include perforating the sheet to leave protuberances around the holes and perforating the sheet to leave burrs around the holes.

While commercially available texturized corrugated structured packing has been shown to achieve good results, it has sometimes resulted in poor performance in some situations such as under turndown conditions. For example, it has been observed that liquid tends to flow in the corners of the corrugations which is detrimental to the performance of the packing. This requires removing or disrupting the accumulated liquid running in the corners or suffer with degraded performance. Thus it is desirable to have texturized corrugated structured packing which performs well under all distillation conditions including turndown.

Accordingly it is an object of this invention to provide improved texturized corrugated structured packing which can perform well under all distillation conditions including turndown.

It is another object of this invention to provide a distillation method which can be carried out effectively under all distillation conditions including turndown and which employs texturized corrugated structured packing as vapor-liquid contact elements for the distillation.

SUMMARY OF THE INVENTION

The above and other objects which will become apparent to one skilled in the art upon a reading of this disclosure are attained by the present invention one aspect of which is:

Structured packing comprising textured, corrugated sheet material having sharp corners at the corrugations, a ratio of the developed sheet thickness difference at the corners to the developed sheet thickness difference between the corners which exceeds 0.6, and corners where the ratio of twice the corner radius to the corrugation height is less than 0.75.

Another aspect of the invention comprises:

A method for carrying out distillation comprising passing vapor and liquid countercurrently in a column containing structured packing comprising textured, corrugated sheet material having sharp corners at the corrugations, a ratio of the developed sheet thickness difference at the corners to the developed sheet thickness difference between the corners which exceeds 0.6, and corners where the ratio of twice the corner radius to the corrugation height is less than 0.75.

Yet another aspect of the invention comprises:

A column containing vapor liquid contacting elements comprising structured packing comprising textured, corrugated sheet material having sharp corners at the corrugations, a ratio of the developed sheet thickness difference at the corners to the developed sheet thickness difference between the corners which exceeds 0.6, and corners where the ratio of twice the corner radius to the corrugation height is less than 0.75.

As used herein the term "developed sheet thickness" means the apparent overall thickness of the texturized sheet. It can be measured, for example, by a vernier gauge which extends over a number of elements which make up the texturization.

As used herein the term "developed sheet thickness difference" means the difference between the developed sheet thickness and the untexturized sheet thickness at any particular point of the structured packing.

As used herein, the term "HETP" means the height of packing over which a composition change is achieved which is equivalent to the composition change achieved by a theoretical plate.

As used herein, the term "theoretical plate" means a contact process between vapor and liquid such that the exiting vapor and liquid streams are in equilibrium.

As used herein, the term "structured packing" means packing wherein individual members have specific orientation relative to each other and to the column axis. Examples of structured packing include Stedman packing, described in U.S. Pat. No. 2,047,444 and more recently developed structured packing such as disclosed in U.S. Pat. No. 4,186,19-Huber, U.S. Pat. No. 4,296,050-Meier, and U.S. Pat. No. 4,929,399-Lockett et al.

As used herein the term "turndown" means operation at flow rates which are less than normal design flow rates.

As used herein the term "corner radius" means the inside radius of curvature of the metal at the corner making up the corrugation.

As used herein the term "corrugation height" means the distance between a plane through the crests and a plane through the valleys of the corrugations.

The term, "column", as used in the present specification and claims means a distillation or fractionation column or zone, i.e., a contacting column or zone wherein liquid and vapor phases are countercurrently contacted to effect separation of a fluid mixture, as for example, by contacting of the vapor and liquid phases on a series or vertically spaced trays or plates mounted within the column and/or on packing elements. For a further discussion of distillation columns see the Chemical Engineers' Handbook. Fifth Edition, Edited by R. H. Perry and C. h. Chilton, McGraw-Hill Book Company, New York, Section 13, "Distillation" B. D. Smith et al, page 13-3, *The Continuous Distillation Process.*

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns.

The term double column is used herein to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

As used herein, the term "argon column" means a column wherein upflowing vapor becomes progressively enriched in argon by countercurrent flow against descending liquid and an argon product is withdrawn from the column.

DETAILED DESCRIPTION

The invention comprises, in general, a change in the relationship of the textured surface at the corners to the textured surface between the corners of defined sharp angle corrugated structured packing from that of commercially available structured parking. The improvement of this invention enables one to carry out distillation, especially under turndown conditions, with markedly lower HETP's than is possible with conventional commercially available structured packing.

Figure 1:
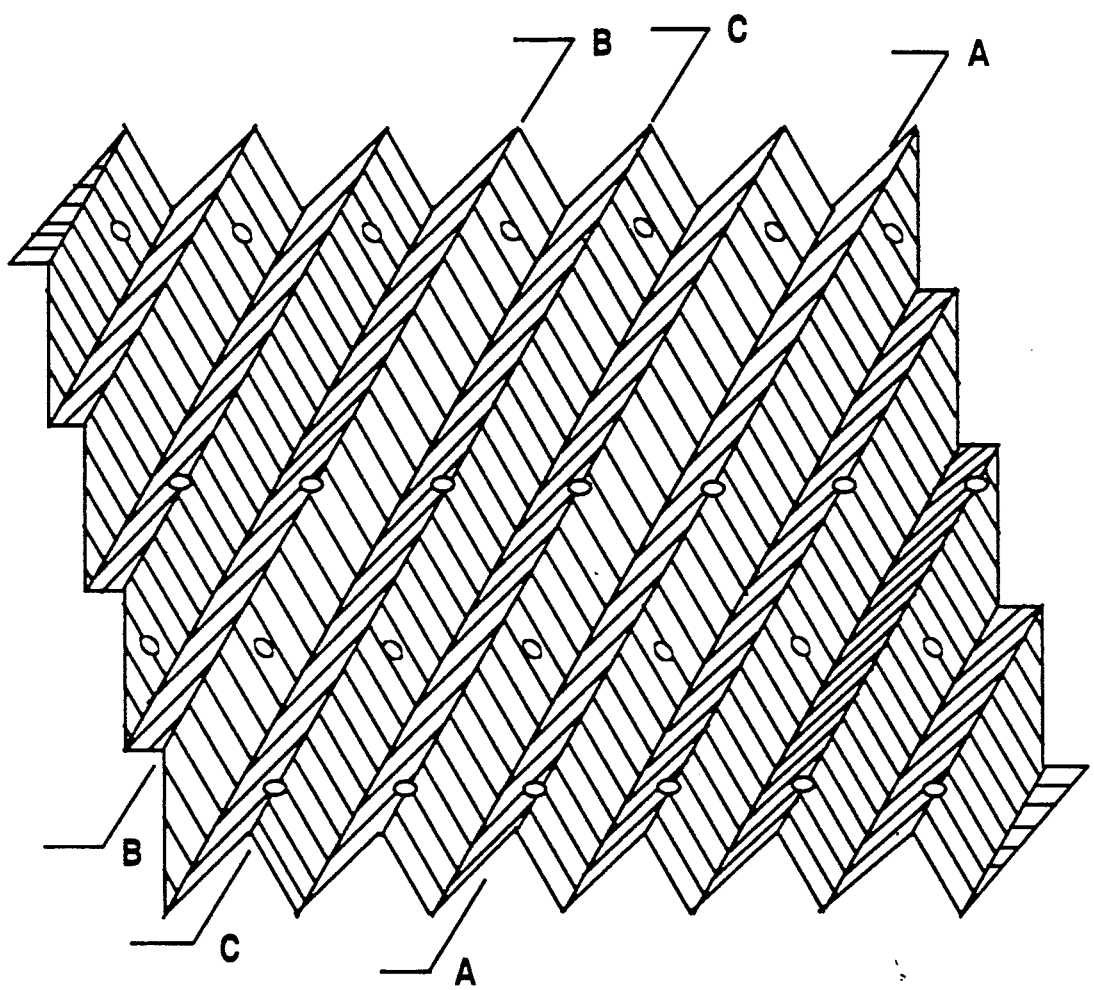
FIG. 1 is a representation of textured corrugated structured packing which is used to illustrate the differences between the invention and presently available commercial structured packing.

Structured packing may comprise a series of thin corrugated, texturized sheets of material, generally of metal such as aluminum, copper or stainless steel, which are vertically oriented within a column with the corrugations at an angle to the column axis. A typical single sheet of corrugated, texturized structured packing is illustrated in FIG. 1. The surface texture of the sheet illustrated in FIG. 1 is fluting.

Figure 2:
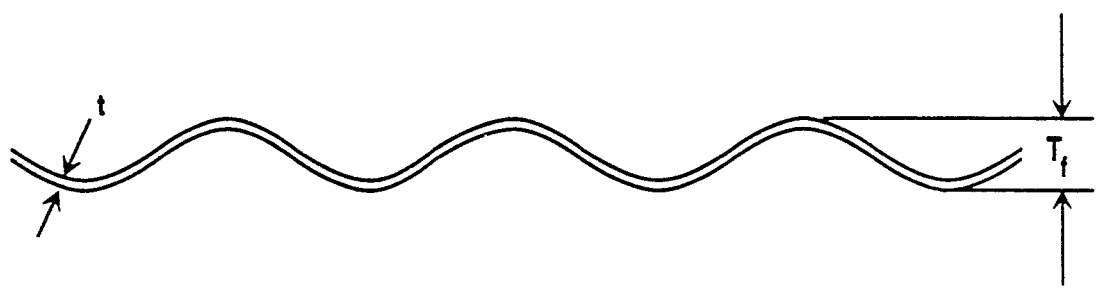
FIG. 2 is a view as might be seen along line A—A of FIG. 1 and is offered to illustrate the concept of the developed sheet thickness.
Figure 3A:
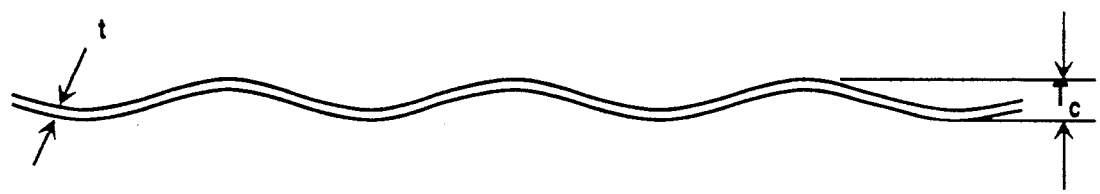
FIG. 3A is a view as might be seen along line B—B of FIG. 1 and illustrates the typical developed sheet thickness at the corners of conventionally available texturized corrugated structured packing.
Figure 3B:
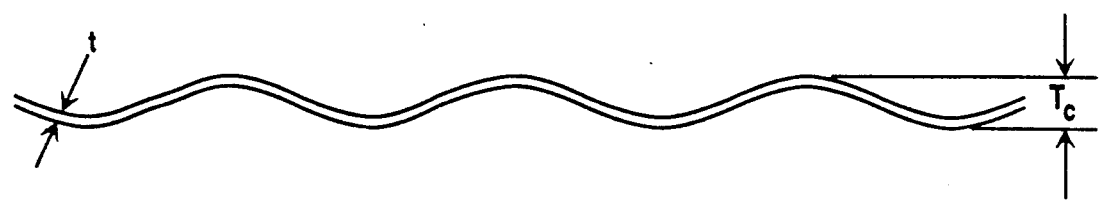
FIG. 3B is a view as might be seen along line C—C of FIG. 1 and illustrates developed sheet thickness at the corners of texturized corrugated structured packing of this invention.

FIG. 2 shows a section through the sheet along line A—A of FIG. 1, where A—A is parallel to the angle of corrugations and the section is taken an equal distance between a crest and a valley, i.e., away from the corners of the flat part of the sheet. FIGS. 3A and 3B show a section through a sheet along B—B and C—C respectively of FIG. 1, where B—B and C—C are parallel to the angle of corrugations and the section is taken along the corner of the corrugation.

In FIGS. 2, 3A and 3B the thickness of the untexturized sheet is t. The developed thickness of the texturized material may be represented by $T_f$ for the flat part of the sheet and by $T_c$ for the sheet in the corner of the corrugations. The developed thickness can conveniently be measured using a vernier gauge. The measuring surface of the gauge must extend over at least two elements which make up the surface texture, which for the case shown in FIGS. 1, 2, 3A and 3B is at least two flutes. This is so that the gauge measures the developed thickness $T_f$ or $T_c$ and not the sheet metal thickness t.

The developed sheet thickness difference at the corners may be represented as $T_c$-t and the developed sheet thickness difference at points intermediate the corners may be represented as $T_f$-t. As can be seen from FIGS. 2 and 3A, the developed sheet thickness difference at the corners, or $T_c$-t, is significantly less than the developed sheet thickness difference intermediate the corners, or $T_f$-t. While not wishing to be held to any theory, applicants believe that this large difference is an inherent result of the manner by which such packing is manufactured. This manufacturing method comprises first texturizing a flat sheet of material and then corrugating it. In the corrugation process the material is crushed or flattened at the corners resulting in the significant disparity between the developed sheet thickness difference at the corners and the intermediate points.

Applicants have discovered that it is this disparity which, under certain defined sharp corner conditions, is the cause of the observed poor performance of texturized, corrugated, structured packing under turndown conditions. The invention comprises texturized, corrugated, structured packing having defined sharp corners and having a defined unconventional high ratio of developed sheet thickness difference at the corners to the developed sheet thickness difference at intermediate points. The invention enables one to carry out distillation in a column while avoiding the degradation of performance at turndown heretofore experienced with conventional commercially available texturized, corrugated, structured packing.

Figure 6:
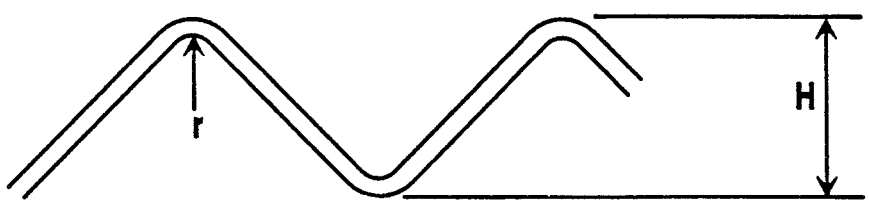
FIG. 6 is a simplified representation to illustrate the concepts of corner radius and corrugation height.

The invention comprises textured, corrugated structured packing having a defined high ratio R which exceeds 0.6 where R is defined as the ratio of the developed sheet thickness difference at the corners to the developed sheet thickness difference between the corners, or, in symbolic terms, as $R=(T_c-t)/(T_f-t)>0.6$. A view of Tc and t for the invention is shown in FIG. 3B. Note that Tc for the invention as illustrated in FIG. 3B significantly exceeds Tc for conventional packing as illustrated in FIG. 3A. Preferably the R ratio exceeds 0.7 and most preferably exceeds 0.8. Moreover, the invention requires that the ratio of twice the corrugation radius r to the corrugation height H be less than 0.75, i.e that the corners be sharp. The concepts of corrugation radius r and corrugation height H are illustrated in FIG. 6. In symbolic terms this sharp corner ratio S is defined as $S=2r/H<0.75$. This second requirement is because for a sinusoidal curvature where S exceeds 0.75 and can approach 1.0, first the manufacturing process may not crush or flatten the texturization such as occurs with a sharp corner, and, second the sinusoidal corner prevents liquid focusing. It is preferred that all of the corners of the packing sheet conform to these specifications although the value of the invention will not be lost if a few corners are not in compliance.

Figure 7:
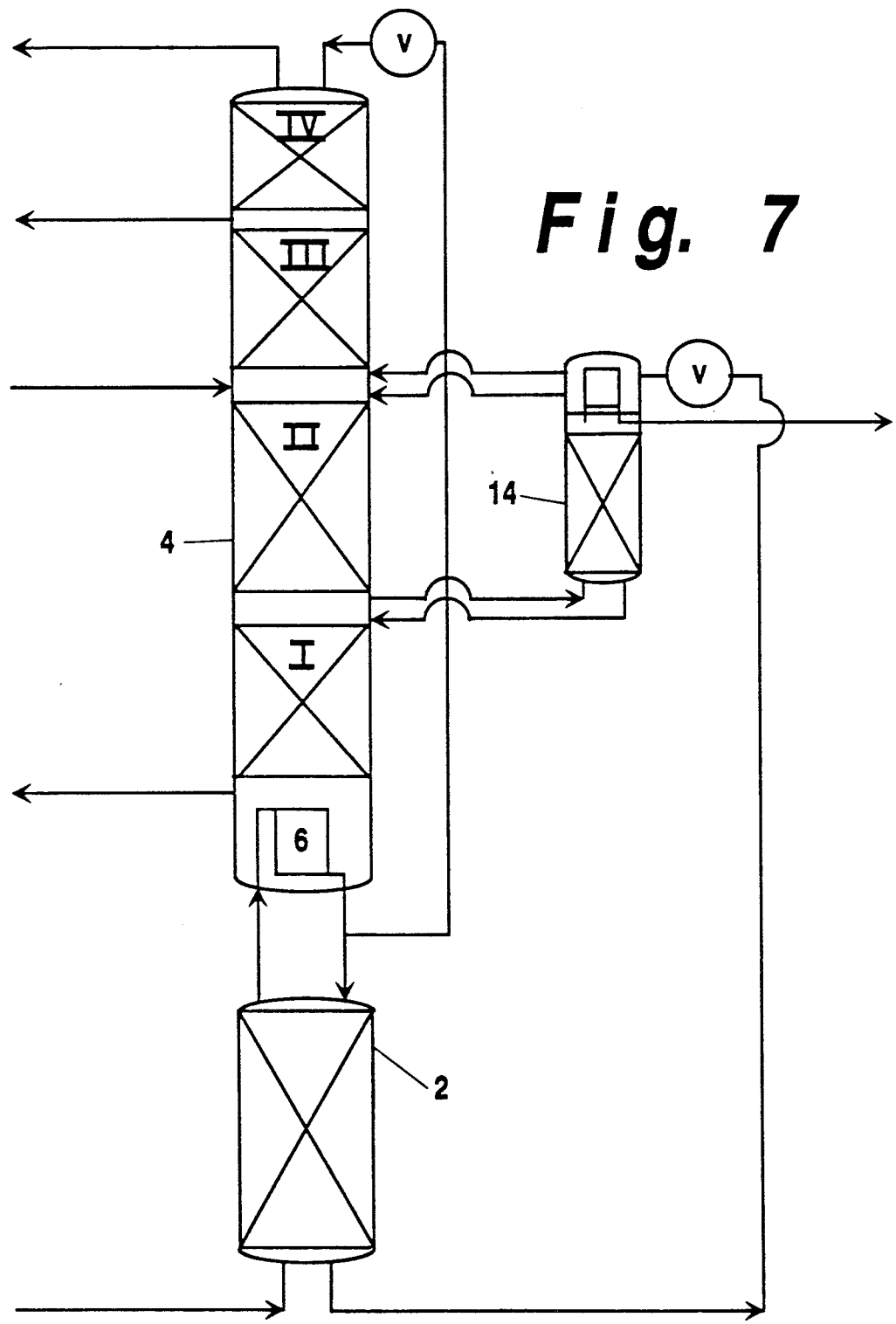
FIG. 7 is a simplified schematic representation of an air separation plant comprising a double column with an associated argon column.

The invention may be employed in any distillation process wherein vapor and liquid are countercurrently contacted in a column to effect separation into more volatile and less volatile component(s). The invention is particularly useful in cryogenic distillation, especially air separation processes where a fluid mixture comprising two or more of oxygen, nitrogen and argon is separated. FIG. 7 illustrates a double column air separation system including a double column comprising high pressure column 2, lower pressure column 4, main condenser 6 and argon column 14.

One way the structured packing of the invention may be manufactured in order to produce an R value greater than 0.6 is as follows. The texturization process is carried out and then the clearance between the dies used for the corrugating process can be varied. Depending on the depth of the texturization and on the specific material used, the preferred clearance between the dies may be arrived at which give an R value greater than 0.6 while simultaneously forming suitably sharp corners with S less than 0.75.

The following examples and comparative examples are presented for illustrative purposes and are not intended to be limiting.

Tests were carried out in a pilot-plant column for the cryogenic distillation of air. The column was 12 inches in internal diameter and the total bed height of structured packing contained in the column was 115 inches. The column was operated in batch mode at total reflux. A mixture of argon and oxygen was used as the test mixture at a column head pressure of 22 pounds per square inch absolute (psia) and with 95 molar percent oxygen at the bottom of the packing. The packing tested was corrugated structured packing with sheets having fluting for surface texturization similar to that shown in FIG. 1. The packing had a surface area of approximately 350 m²/m³. The corrugations were at 45° to the vertical and 11 layers of packing were used, each one offset at 90° to the two adjacent layers.

Two packings were tested, designated packing number 1 and packing number 2. Packing number 1 was representative of conventional commercially available textured corrugated structured packing and had an R ratio of 0.57. Packing number 2 was structured packing of the invention and was specially constructed to have an R ratio of 0.85. In this case the high R ratio was achieved by increasing the distance between the dies used in the corrugation process. All other geometric packing variables were held constant. Both packing number 1 and packing number 2 were constructed having S ratios of 0.48.

The tests of each packing measured the HETP and the pressure drop against the hydraulic load for the vapor in the column which is designated as CV and is defined as:

$$CV = \frac{M_G}{A_T \rho_G} \left[ \frac{\rho_G}{\rho_L - \rho_G} \right]^{0.5}$$

where
$M_G$ = vapor flow rate, lb/s
$\rho_G$ = vapor density, lb/ft³
$\rho_L$ = liquid density, lb/ft³
$A_T$ = column cross-sectional area, ft²

Figure 4:
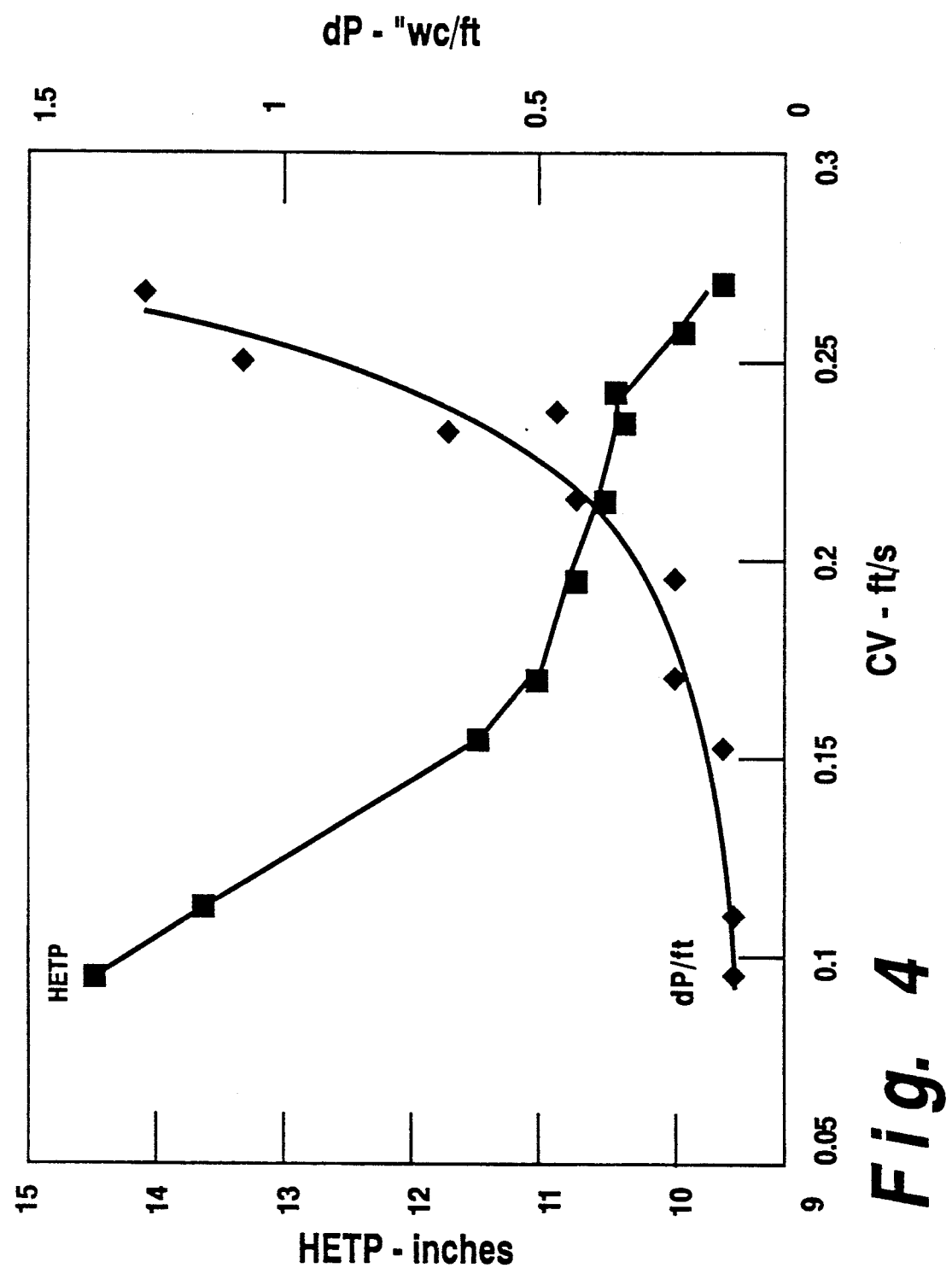
FIG. 4 is a graphical representation of HETP and pressure drop plotted against the hydraulic load for the vapor for conventional commercially available texturized corrugated structured packing.
Figure 5:
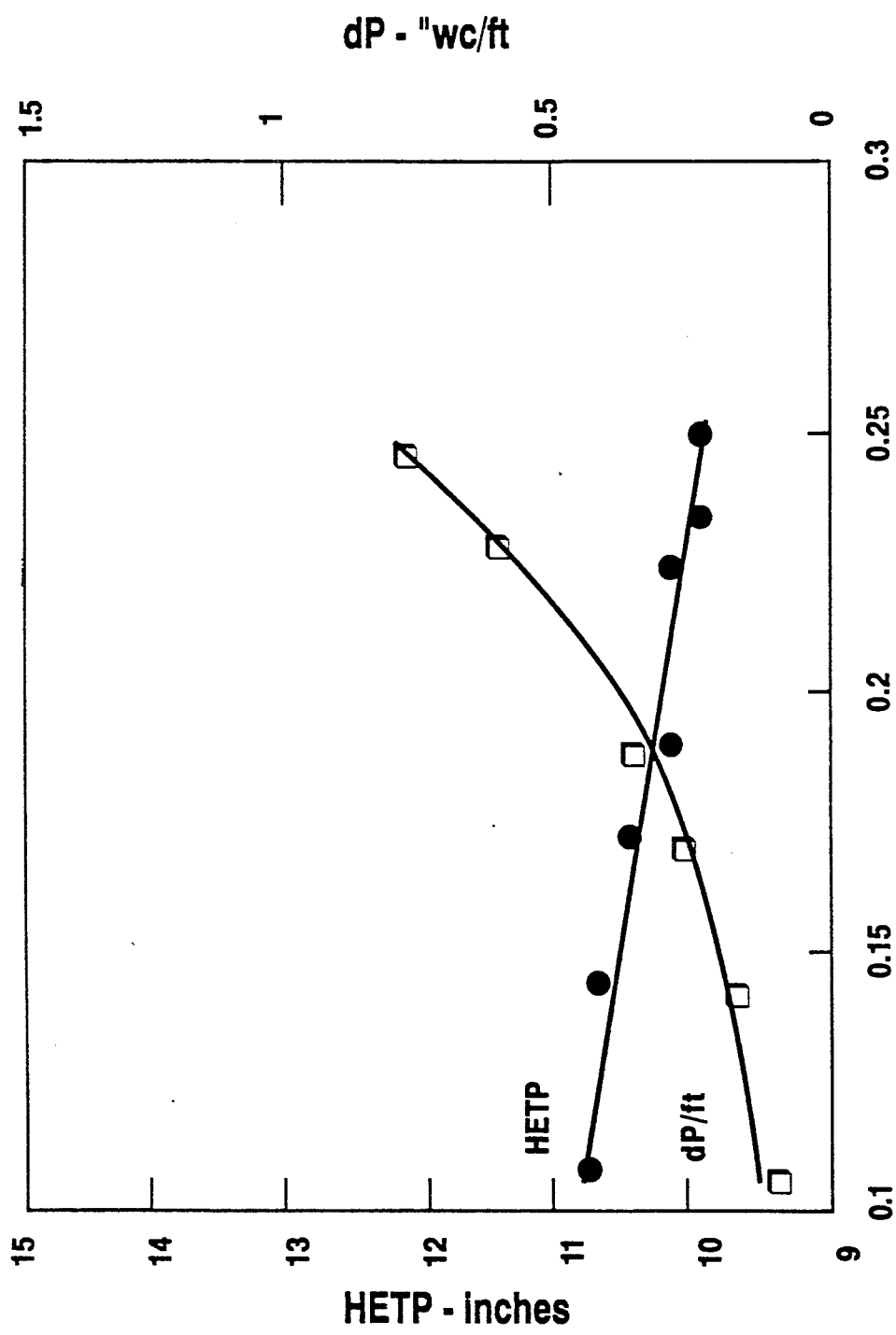
FIG. 5 is a graphical representation of HETP and pressure drop plotted against the hydraulic load for the vapor for the improved texturized corrugated structured packing of this invention.

FIG. 4 shows HETP and pressure drop (inches water/ft) plotted against CV for packing number 1. This packing performed poorly at CV values below 0.15 ft/s where the HETP increased from 11.5 inches at CV=0.15 ft/s to over 14 inches at CV=0.10 ft/s. FIG. 5 shows tests using packing number 2. For this packing as CV was reduced from 0.15 to 0.10 ft/s, the value of the HETP increased only slightly and significantly less than for packing number 1. There was no detectable difference in the pressure drop between the two packings.

The fact that the pressure drop of packing number 1 and of packing number 2 were substantially the same serves as confirmation that there was no significant difference in geometry between the two packings other than the difference in R values. Differences in geometry between packings such as, for example, those which give a difference in interfacial area per unit volume, might also result in a difference in HETP between the packings. However, such a geometry difference would also evidence itself as a difference between the pressure drop characteristics of the packings.

The increased HETP of packing number 1 at reduced flow rates is undesirable because the reduced separation performance of the packing would lead to reduced product recoveries when used in an operating distillation plant such as an air separation plant.

While not wishing to be held to any theory, it is believed that the improved packing of the invention causes disruption and redistribution of liquid from the corners of the corrugations which otherwise tends to accumulate and preferentially flow along the corners. Redistributed liquid is caused to flow over and more fully wet the flat surfaces of the packing and this in turn causes a reduction in HETP because the effective interfacial area for vapor-liquid contact is thereby increased. The redistribution effect is more pronounced at turndown conditions because, under these conditions, the liquid flow rate is reduced and less liquid is available to wet the packing. Any loss of liquid as preferential flow in the corners is a bigger problem at turndown because of the comparative shortage of liquid. Furthermore, the redistributing effect of vapor, which also tends to cause liquid to spread over the packing, is also reduced at turndown conditions.

Although the invention has been described in detail with reference to certain preferred embodiments, those skilled in the art will recognize that there are other embodiments of the invention within the spirit and the scope of the claims.

We claim:

1. Structured packing comprising textured, corrugated metal sheet material having sharp corners at the corrugations, a ratio of the developed sheet thickness difference at the corners to the developed sheet thickness difference between the corners which exceeds 0.6, and corners where the ratio of twice the corner radius to the corrugation height is less than 0.75.

2. The structured packing of claim 1 wherein the ratio of the developed sheet thickness difference at the corners to the developed sheet thickness difference between the corners exceeds 0.7.

3. The structured packing of claim 1 wherein the ratio of the developed sheet thickness difference at the corners to the developed sheet thickness difference between the corners exceeds 0.8.

4. The structured packing of claim 1 wherein the texture comprises fluting.

5. The structured packing of claim 1 further comprising perforations through the packing sheet material.

6. The structured packing of claim 1 comprised of aluminum.

7. The structured packing of claim 1 comprised of copper.

8. The structured packing of claim 1 comprised of stainless steel.

9. A column containing vapor liquid contacting elements comprising structured packing comprising textured, corrugated metal sheet material having sharp corners at the corrugations, a ratio of the developed sheet thickness difference at the corners to the developed sheet thickness difference between the corners which exceeds 0.6, and corners where the ratio of twice the corner radius to the corrugation height is less than 0.75.

10. The column of claim 9 wherein the structured packing has a ratio of the developed sheet thickness difference at the corners to the developed sheet thickness difference between the corners which exceeds 0.7.

11. The column of claim 9 wherein the structured packing texture comprises fluting.

12. The column of claim 9 wherein the structured packing further comprises perforations through the packing sheet material.

13. The column of claim 9 wherein the structured packing comprises aluminum.

14. The column of claim 9 which is the lower pressure column of a double column system.

15. The column of claim 9 which is the higher pressure column of a double column system.

16. The column of claim 9 which is an argon column of an air separation plant having a double column system.

17. A method for carrying out distillation comprising passing vapor and liquid countercurrently in a column containing structured packing comprising textured, corrugated metal sheet material having sharp corners at the corrugations, a ratio of the developed sheet thickness difference at the corners to the developed sheet thickness difference between the corners which exceeds 0.6, and corners where the ratio of twice the corner radius to the corrugation height is less than 0.75.

18. The method of claim 17 wherein the ratio of the developed sheet thickness difference at the corners to the developed sheet thickness difference between the corners exceeds 0.7.

19. The method of claim 17 wherein the distillation is cryogenic distillation.

20. The method of claim 17 wherein the vapor and liquid within the column comprises at least two of oxygen, nitrogen and argon.

21. The method of claim 17 wherein the countercurrent flow of vapor and liquid in the column is carried out under turndown conditions.

* * * * *